United States Patent

Noggle

Patent Number: 5,154,551
Date of Patent: Oct. 13, 1992

[54] ADJUSTABLE BORING BAR

[75] Inventor: Kenneth G. Noggle, W. Bloomfield, Mich.

[73] Assignee: GTE Valenite Corporation, Troy, Mich.

[21] Appl. No.: 848,561

[22] Filed: Mar. 9, 1992

Related U.S. Application Data

[63] Continuation of Ser. No. 653,590, Feb. 11, 1991, abandoned.

[51] Int. Cl.⁵ .............................................. B23B 27/00
[52] U.S. Cl. .................................. 408/180; 408/155; 408/154
[58] Field of Search ............... 408/180, 714, 154–156; 407/89, 9, 76, 83

[56] References Cited

U.S. PATENT DOCUMENTS

| | | |
|---|---|---|
| 1,721,129 | 7/1929 | Mehl . |
| 1,761,804 | 6/1930 | Snyder . |
| 2,458,753 | 1/1949 | Wallace . |
| 2,903,781 | 9/1959 | Hudson . |
| 2,962,800 | 12/1960 | Swenson . |
| 3,125,798 | 3/1964 | Stein . |
| 4,292,865 | 10/1981 | Livetal . |
| 4,343,576 | 8/1982 | Lagerholm et al. ............... 408/155 |
| 4,692,069 | 9/1987 | Kieninger . |
| 4,927,301 | 5/1990 | Reiterman .......................... 408/180 |

FOREIGN PATENT DOCUMENTS 904900 8/1988 U.S.S.R. .

Primary Examiner—Larry Schwartz
Assistant Examiner—Robert Schultz
Attorney, Agent, or Firm—Bill C. Panagos

[57] ABSTRACT

An adjustable cartridge to be mounted in a boring bar, the cartridge including an anvil rotatably affixed to said boring bar, said anvil including a pocket into which a lay-down indexable insert is affixed. The anvil is secured in an axially oriented slot which includes an arcuate seating face. Rotation of the anvil within the slot effects radial adjustment of the insert.

12 Claims, 2 Drawing Sheets

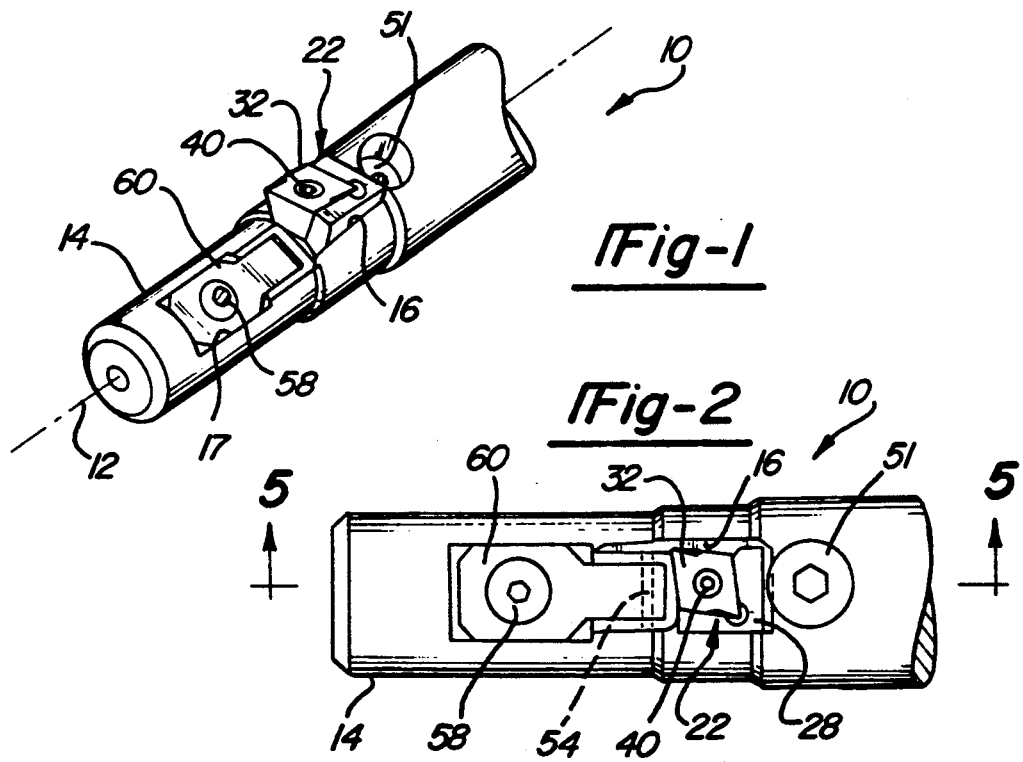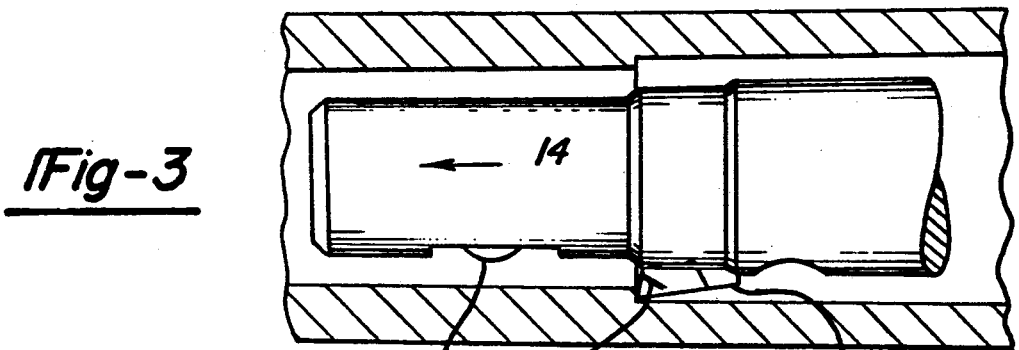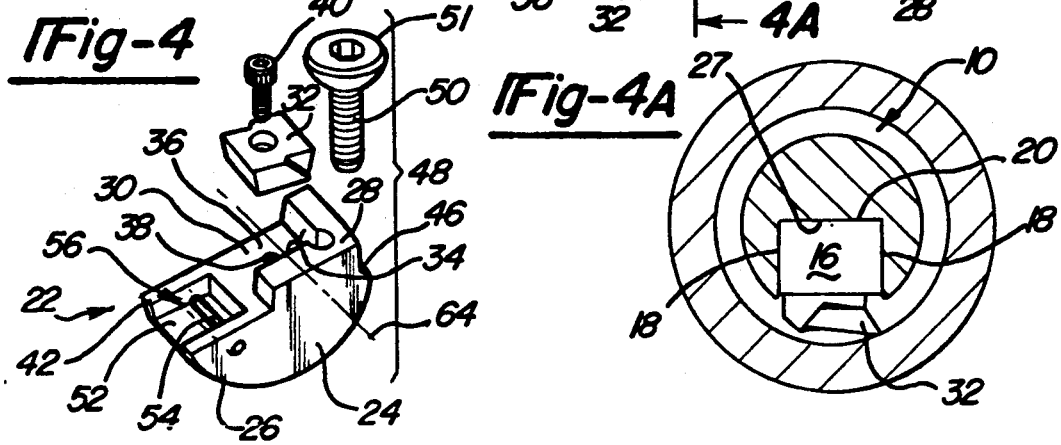

ADJUSTABLE BORING BAR

This is a continuation of copending application Ser. No. 653,590, filed on Feb. 11, 1991, now abandoned.

BACKGROUND OF THE INVENTION

1. Field of the Invention

The present invention relates to the filed of machining tools such as boring bars and more particularly to improved boring bars with adjustable cartridges. The boring bar includes a slotted area with an arcuate bottom face on which a correspondingly shaped surface of an anvil is seated. The boring bar also includes means for causing the anvil to slide upon a radiused surface of the boring bar and to rotate the anvil and cutting insert affixed thereto against a tension leaf spring relative to the boring bar. Set screws are thereby eliminated as the anvil is held in place by tension generated against the leaf spring.

2. Description of the Related Art

Pataky, U.S. Pat. No. 3,885,282 describes a machining tool including a holder and insert to which a cutting tool can be attached. The insert is rotatably mounted in a recess in the holder and fixed in a desired position relative to the holder by a locking screw. Rotatable adjustment of the insert allows for the altering of the tip working angle.

Jester et al., U.S. Pat. No. 4,631,994 describe a linearly and angularly adjustable holder for a cutting tool. Such tool permits pivotal adjustment by means of an adjustment screw having a threaded portion seated in a basic element and a head which engages a recess in a rotatably mounted receptacle element which holds a cutting tool insert. Rotation of the adjustment screw causes rotation of the receptacle element.

However, the structures described in the above mentioned patents are not directed to alleviating the problem of "stacked" tolerances. In addition, high speed boring bars cannot meet the precision cutting parameters required today with traditional cartridges mounted to the periphery of the boring bar due to the chatter created. Although creating a recess large enough to seat the cartridge within the bar may stabilize the bar, radial adjustment where the adjustment force is directed against the bar would still induce bowing of the bar in narrow diameter boring bars.

Noggle, U.S. Pat. No. 4,927,301, which is incorporated by reference as if fully set forth herein, is directed to an improved boring bar which meets the shortcomings of bowing and stacked tolerances. The bar is equipped with a an anvil shaped cartridge which fits into a radiused bottom shaped groove in the bar. The anvil is adjusted by means of loosening a set screw, adjusting the anvil by means of an arcuate headed screw which forced the anvil against a spring washer retained by another screw at the opposite end of the anvil, and then, when the desired position is reached, the set screw is again rotated to lock the assembly in place.

The present invention is an improvement over U.S. Pat. No. 4,927,301. The lock screw is eliminated, as are the spring washers. The method of operation is thereby simplified to a one step adjustment, thereby resulting in ease of operation, elimination of the set screws, and substantial labor savings.

It is therefore an object of the present invention to provide an adjustable insert cartridge recessed within a boring bar where the force required for radial adjustment of the inserts is insufficient to induce bowing a boring bars, It is a further object to provide an adjustable cartridge which is properly balanced in high speed applications.

Finally, it is a further object of this invention to provide an adjustable cartridge which is easily adjusted and holds the cartridge in place without the need for lock screw.

SUMMARY OF THE INVENTION

The present invention is directed to an adjustable cartridge in a rotatable boring bar which is easily adjusted by rotation of a single screw. The boring bar has a longitudinally oriented slot or recess with planar parallel walls which are spaced by the width of an arcuate seating surface. It is important that the cartridge seat have full contact, or at least two point contact, on the seating surface. It had been a disadvantage of the prior art that the cartridge sometimes did not seat along the seating surface in at least two points, thereby contributing to the chatter observed when using such boring bars. The seating surface intersects with the walls and opens radially to the periphery of the boring bar, The cartridge includes an anvil with a top face and a radiused bottom face. The top face includes a recessed pocket for receipt of an indexable insert, positioned between forward and rear portions. The radiused face of the anvil extends between the forward and rear portions and when seated within the slot, abuts against the corresponding radiused face. The forward and rear portions are recessed for receipt of means for preloading the anvil in said arcuate seat, respectively.

The insert is positioned on the anvil and is axially spaced from the rotational center of the anvil such that fine adjustment may be accomplished and such that loading resulting from cutting operation is principally transferred to the bar. Inwardly directed cutting reaction forces on the cutting edges thus tend to load the anvil and the adjustment means rather that the preloading means. An advantage of the present invention is that the resilient preloading means is removed from the loading action, allowing for precision adjustment while minimizing chatter. Another advantage is that an indexable insert and adjustable cartridge is provided in a boring bar without removal of a large portion of bar stock, thereby maintaining tool strength. A further advantage is that the rotation of the anvil in the bottom of the bar eliminates the need for adjustment means which load the boring bar to the extent of inducing bowing in small diameter bars. A final improvement is that the cartridge may be adjusted in the arcuate sot and held in place without resort to lock screws passing through the bar and abutting the adjusting screw for the anvil or other means to retain the anvil against the side wall of the recess to retain the anvil in place.

BRIEF DESCRIPTION OF THE DRAWINGS

FIG. 1 is a perspective view of the boring bar of the present invention containing at least one adjustable cartridge.

FIG. 2 is an enlarged sectional top plan view of the embodiment of FIG. 1.

FIG. 3 is a side view of the embodiment of FIG. 2.

FIG. 4 is a exploded perspective view of the cartridge illustrated in FIG. 2.

FIG. 4a is a plan view of the embodiment of FIG. 3, taken through line 4—4.

DETAILED DESCRIPTION OF THE PREFERRED EMBODIMENTS

Figure 5:
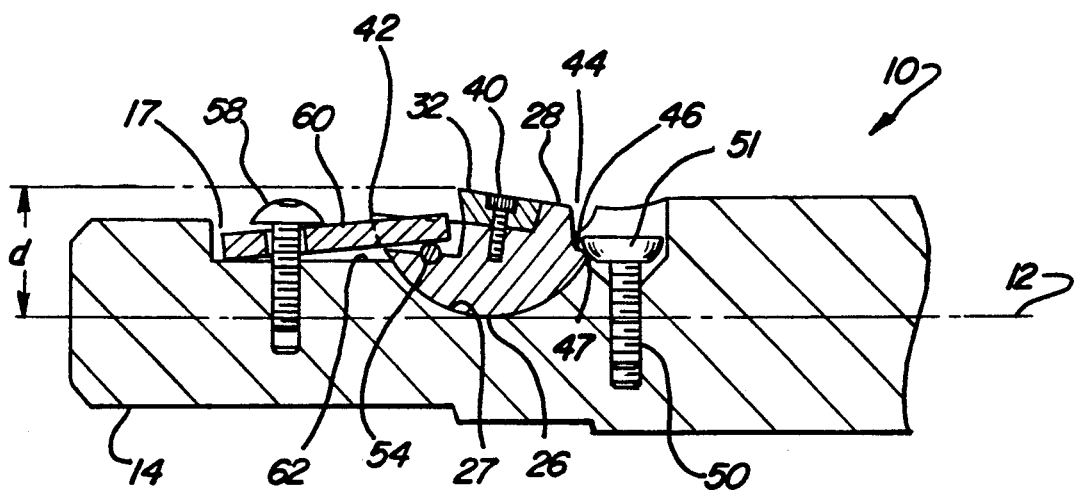
FIG. 5 is a plane view of the embodiment of FIG. 2 taken through section 5—5 showing the preloading means under tension.

Referring to the figures, wherein like numerals depict like structures, a boring bar 10 is provided for rotation about a longitudinally disposed axis 12. Boring bar 10 as is known in the art is of cylindrical form having a periphery 14. Disposed about the periphery is at least one, and, if desired, a plurality of axially dimensioned slots or recesses 16. Each recess includes parallel walls 18 joined at an arcuate seating surface 20 which opens radially toward the periphery.

The cartridge 22 comprises an anvil 24 which is generally an elongated piece of hardened tool steel having a uniform width and an axial dimension corresponding to the particular recess 16 selected. The cartridge 22 further includes a radiused lower surface 26 which corresponds to the arcuate surface 27 to allow for axial rotation in the clockwise direction, or counter clockwise direction, depending upon the manner in which it is desired to adjust the cartridge.

Anvil 24 further includes a top face 28 radially spaced from lower surface 26 and at least one pocket 30 for receipt of lay down indexable insert 32. The pocket has at least two abutment walls 34 which intersect with a seating face 36. Seating face 36 includes an aperture 38 tapped to provide secure retention for an insert retaining screw 40. Although other securing means are available to those of ordinary skill in the art and are readily useable in the present invention with the appropriate modifications, a standard "iso" screw is preferred due to pace and weight considerations near the work piece.

Figure 6:
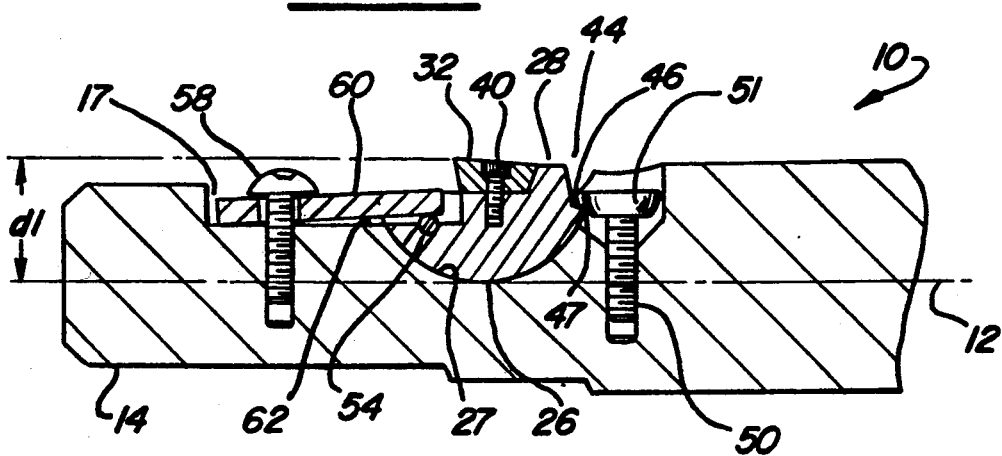
FIG. 6 is a plane view of the embodiment of FIG. 2 taken through section 5—5 with the load released from the preloading means.

Referring to FIGS. 5 and 6, top face 28 includes axially spaced forward 42 and rear portions 44 separated by insert 32. Arcuate lower surface extends from the forward 42 to rear portion 44. The rear portion 44 includes a first recessed area 46 which communicates motion from means for adjusting the cartridge and inducing counterclockwise rotation for radially adjustment of the insert 32. Although the range of adjustment is at least as much as the total "stacked" manufacturing tolerances of cartridge 22 and bar 10, a range of adjustment through adjustment means 48 of as much as 0.020 inches is preferred.

In particular, adjustment means 48 comprises an arcuate headed screw 50 threaded in the boring bar and abutting a conical face 47 of the first recessed area 46 to provide camming force to the anvil 24. In order to eliminate slippage, a right hand screw is desired with a fine pitch and in particular with 32 threads per inch. There is no need for a securing screw to lock screw 50 in place as was the case in the prior art, particularly U.S. Pat. No. 4,927,301. This is a distinct advantage as the operator may easily adjust the anvil and be confident that it will remain in place without the added step of locking the screw in place with a locking set screw. The elimination of this lock screw results in substantial savings both in cost of manufacture because there is no need to drill apertures into the side of the bar transverse to the axis of rotation for receipt of the set screw, thereby contributing to the increased strength of the bar, and labor costs are reduced because the adjustment process has been simplified.

The forward portion 42 includes a second recess area 52 and may include a dowel 54 which traverses an optional spring pocket 56 in area 52 of anvil 24. Means for preloading the anvil 24 in recess 16 during adjustment is provided in the present invention as illustrated in FIGS. 5 and 6. Screw 58 retains leaf spring 60 against second recessed area 52 and threads into the body 10 at floor 62 of recess 17. The recess is adapted to receive the aprinbg and includes sidewalls substantiall parallel to each other and parallel to the axis of rotation. The spring is held against the anvil at recess 52 to provide resilient preloading force. Dowel 54 is optionally present as a rolling surface to the spring. Should dowel 54 not be present, the spring locates against the surface of recess 54.

Lay down inserts 32 comprise generally a wafer of hardened material such that tungsten carbide, ceramics or sialons to name a few. The desired material is dependent on the type of application and the boring parameters. For example, an a 2¼ inch boring bar about 32 inches in length and employing five adjustment cartridges as claimed and disclosed herein, ⅜ wide by 0.460 inch parallelogram shaped inserts available from GTE Valenite Corporation using tungsten carbide grade VC-2 are employed for soft abrasive materials such as cast iron. For boring applications in carbon steel, carbide grade VC-5 is available. In addition, various positive radial and negative axial rakes are contemplated depending on the application. When boring in carbon steel, it is preferable to employ parallelogram shaped inserts using a positive radial and axial rakes. In cutting materials such as cast iron, negative axial and radial rakes are employed. It will be recognized by those of skill in the art that the range of axial and radial rake angles will depend on a range of variables including the part specifications.

The position of insert 32 and insert pocket 30 on top face 28 is important to obtaining the above disclosed range if adjustment. When anvil 24 is rotated within recess 16, it rotates about anvil central axis 64 when unrestricted by preloading means or adjustment means. Positioning pocket 30 and insert 32 axially from cental axis 64 toward forward portion 42 results in a decreasing range of adjustment the closer the pocket is placed to central axis 64. Although the exact position of insert 62 in anvil 24 depends in part on the size of the insert and anvil, it is generally known to those of ordinary skill in the art that loading during operation is absorbed by the boring bar rather than preloading means or adjusting means the closer the pocket 30 is placed to central axis 64. This results in reduced cartridge chatter and wear on the adjustment means.

The present invention eliminates the need of a plurality of tapped apertures which would traverse the boring bar 10 in a direction generally normal to the recess walls and which open to the boring bar periphery 14 to provide access to an operator. The apertures allow the insertion of screws to force the anvil to abut one wall of recess 16, thereby holding it in place. The elimination of these screws results in a substantial savings in operation and machining costs.

In operation, rapid adjustment of the radial position of the insets 32 is accomplished by adjusting screw 50, thereby forcing arcuate screw head 51 against conical surface 47 of the first recess 46 of rear portion 44 of anvil 24. The camming force developed between screw head 51 and the first recess 46 drives anvil 24 along arcuate seat surface 20, rotating anvil 24 in the desired direction. Insert 32, spaced axially from the rotational central axis 64 of the anvil is generated radially a distance "d" to a new distance "d1". At the desired point of adjustment, rotation of screw 50 is halted and the preloading means, depicted as leaf spring, holds the anvil in place without the need for set screws or the need for means to force the anvil to abut one of the side walls of recess 16.

Those skilled in the art recognize that various modifications may be made to the structures described herein without departing from the scope and spirit of the invention.

I claim:

1. A boring bar assembly, comprising:
   (a) a generally cylindrical body rotatable about a centrally disposed axis, said body comprising a peripheral surface area and at least one recess, said recess having an axial length dimension and spaced walls substantially parallel with respect to each other and said axis, said recess further including arcuate seating surface which intersects said walls and opens radially to the periphery;
   (b) an adjustable cartridge for receipt into said recess, said cartridge comprising an anvil having a generally planar top face and a radiused bottom face cooperating with said arcuate seating surface to define a rotational adjustment path about a central axis, said top face further comprising axially spaced forward and rear portions, said radiused face extending from said rear portion, said rear portion having a first recessed area for receipt of an insert, said forward portion having a second recessed area for receipt of a preloading means which comprises a screw which is threadably retained in said body proximally to said anvil and a leaf spring which is retained in place by the screw and engages said anvil on said second recessed area of said anvil, said second recessed area comprising a spring retention area comprised of a recess having side walls substantially parallel to each other and the axis of rotation, and a dowel means traversing said retention area and acting as a flexure point for said leaf spring;
   (c) a pocket defined by said first recess area for receipt of the insert and said insert being a polygonal form lay down indexable insert, said insert having a cutting edge seated in said anvil with said edge spaced axially from said central axis so as to impart rotational force about said central axis and loading on a bar adjustment means during operation; and
   (d) the bar adjustment means being for adjusting said cartridge in said boring bar along said adjustment path.

2. The cartridge of claim 1, wherein said adjusting means comprises a screw threaded in said boring bar and abutting said rear portion to drive said anvil along said set in a counterclockwise rotation and thereby effect radial adjustment of said cutting edge.

3. The cartridge of claim 2, wherein said cutting edge has a neutral axis rake and a positive radial rake.

4. The cartridge of claim 3, wherein said rear portion comprises a conical seat for said screw.

5. The cartridge of claim 4, wherein said adjusting means provides a range of radial adjustment of about 0.020 inches.

6. The cartridge of claim 5, wherein said insert is parallelogram in form.

7. A boring bar assembly, comprising a generally cylindrical body rotatable about a centrally disposed axis, said body comprising a peripheral surface area and at least one recess, said recess having an axial length dimension and spaced walls substantially parallel with respect to each other and said axis, said walls extending for said axial length dimension, said recess further including an arcuate seating surface which intersects said walls and opens radially to said periphery, an adjustable cartridge for receipt in said recess, said cartridge comprising an anvil having a generally planar top surface and a radiused bottom surface, said top surface further comprising axially spaced forward and rearward portions separated by a pocket for receipt of a polygonal form lay down indexable insert said insert having a cutting edge seated in said anvil with said edge spaced axially from a center point defined by said arcuate seating surface so to impart rotational force about said center point and said a radiused bottom surface extending from said rearward portion to said forward portion, said rearward portion having a first recessed area for receipt of a means for adjusting said cartridge in said boring bar, said adjustment means comprising a screw threaded in said boring bar and abutting said rearward portion to drive said anvil along said arcuate surface in a counterclockwise direction thereby effecting radial adjustment of said insert, said anvil having a second recessed are for receipt of a means for preloading said anvil in said recess, said preloading means comprising a screw which is threaded into said boring bar body at the rearward portion of the anvil and retains a leaf spring in place against said second recess of said anvil.

8. The cartridge of claim 7, wherein said cutting edge has a neutral axis rake and a positive radial rake.

9. The cartridge of claim 8, wherein said first recessed area comprises a conical seat for said adjustment screw.

10. The cartridge of claim 9, wherein said adjusting means provides a range of radial adjustment for said insert of about 0.020 inches.

11. The cartridge of claim 10, wherein said insert is parallelogram in form.

12. The cartridge of claim 11, wherein said second recessed area comprises a spring retention area and is comprised of a recess having sidewalls substantially parallel to each other and the axis of rotation, and a dowel means traversing said retention area and acting as a flexure for said leaf spring.

* * * * *